United States Patent [19]

Mandler

[11] Patent Number: 4,669,226

[45] Date of Patent: Jun. 2, 1987

[54] DEVICE FOR HOLDING DELICATE WORKPIECES, IN PARTICULAR OPTICAL LENSES AND OTHER OPTICAL STRUCTURAL ELEMENTS

[75] Inventor: Roland Mandler, Heuchelheim, Fed. Rep. of Germany

[73] Assignee: Wilhelm Loh Wetzlar Optikmaschinen GmbH & Co. KG, Wetzlar, Fed. Rep. of Germany

[21] Appl. No.: 761,629

[22] Filed: Aug. 1, 1985

[30] Foreign Application Priority Data

Aug. 3, 1984 [EP] European Pat. Off. ............ 84109233

[51] Int. Cl.⁴ .......................................... B24B 13/005
[52] U.S. Cl. ............................. 51/216 LP; 51/217 L; 51/235; 269/22; 279/1 D; 279/3
[58] Field of Search ............ 51/216 R, 216 LP, 216 T, 51/217 R, 217 T, 217 L, 235, 277, 284 R, 237 R; 269/13, 21, 22; 279/1 B, 1 D, 1 E, 1 Q, 2 A, 3

[56] References Cited

U.S. PATENT DOCUMENTS 3,542,354 11/1970 Fitzpatrick ............................ 269/22
4,470,585 9/1984 Bavelloni .......................... 269/22 X Primary Examiner—Frederick R. Schmidt
Assistant Examiner—Debra S. Meislin
Attorney, Agent, or Firm—Flynn, Thiel, Boutell & Tanis

[57] ABSTRACT

A device for holding delicate workpieces, particularly optical lenses, includes a membrane having a clamping surface. To receive a workpiece, the membrane is pressurized and bulges in such a manner that the clamping surface is enlarged and becomes funnel-shaped. In order to clamp the workpiece, the pressure in the membrane is decreased so that the membrane assumes a shape in which the clamping surface is constricted and holds the workpiece with a force which is evenly distributed over its entire periphery, through which deformation and destruction of workpieces is safely avoided.

12 Claims, 1 Drawing Figure

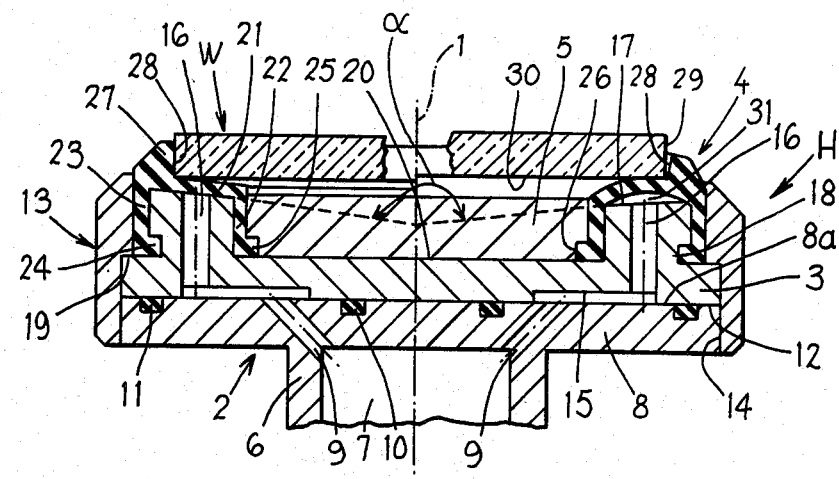

DEVICE FOR HOLDING DELICATE WORKPIECES, IN PARTICULAR OPTICAL LENSES AND OTHER OPTICAL STRUCTURAL ELEMENTS

FIELD OF THE INVENTION

A device for holding delicate workpieces and, more particularly, a device for releasably holding optical lenses during transport.

BACKGROUND OF THE INVENTION

Delicate workpieces, which include in particular optical lenses and other optical structural elements, must be held as gently as possible for various purposes, in particular for transport into a processing machine or out of a processing machine.

Known are holding devices with a vacuum suction apparatus. Vacuum suction devices are only applicable if the surface of the workpiece permits one gasket edge of the suction apparatus to be applied in an air-tight manner against the workpiece. Only then is it possible to create an underpressure or vacuum. A secure hold of the workpiece is only assured if an open or continuous vacuum system is used, so that a small leak does not lead to a reduction of the vacuum. An open vacuum system, however, has the disadvantage that dirt can be sucked into the system. This danger is particularly great in processing machines such as lens grinding machines, where grinding dust accumulates and work must be done with a cooling medium. A conventional indirect vacuum system which is sealed off against dirt does not have a sufficiently secure holding action, since small leaks lead to a quick pressure increase and thus the suction force drops quickly. Furthermore, the direct sucking on of workpieces has the danger that, during suction, the workpiece surface is damaged.

Also known are holding devices with collets of plastic or metal. Workpieces can be held securely therewith, but the danger exists that the workpieces are impermissibly deformed and possibly destroyed by clamping forces which are too great and are applied to a relatively small area of the workpiece.

A basic purpose of the invention is to produce a holding device for delicate workpieces, in particular for optical lenses, with which the workpieces can be held just as securely as with the known collets, but where the holding is deformation-free and without any danger of destruction.

SUMMARY OF THE INVENTION

The inventive device for holding delicate workpieces, preferably optical lenses during transport thereof, is characterized by a membrane of an elastic material which has an annular clamping surface which can engage the workpiece, and a support member on which the membrane is clamped fluid-tight in a manner so that between the support member and the membrane there exists a chamber which can be connected through channels with a pressure source and/or a vacuum source for a fluid, preferably a pressurized gas such as air, wherein by changing the fluid pressure in the chamber the membrane is deformed so that the clamping surface is selectively expanded and contracted.

In a thus-constructed device, the workpiece is held along the entire annular clamping surface. Due to the elasticity of the membrane, the clamping surface rests over its entire length on the workpiece, through which the application of high forces at a few points is avoided. The inventive holding device is insensitive to dirt. The vacuum system is closed, since an underpressure, if used, acts from below the membrane onto same. Generally, the workpiece is gripped at its outer peripheral edge. However, also possible are embodiments which grip the workpiece at an inner edge thereof. In this case, the clamping surface is pulled together prior to the receiving of the workpiece, for example with the help of an underpressure, and is expanded after receiving the workpiece, for example with the help of an excess pressure or with the help of elastic characteristics of the membrane.

In a preferred embodiment, the membrane is constructed annularly. The invention, however, can also be carried out with circular membranes. Annular membranes have the advantage that an exactly defined annular bearing surface is created for the workpiece, for example for one of the optically effective surfaces of an optical lens.

When the clamping surface is arranged near the outer edge of the membrane, one obtains an optical funnel-shaped enlargement which can be used for holding a workpiece on its outer periphery.

An advantageous and secure clamping of the membrane is obtained when clamping walls are provided on the membrane. Such clamping walls can be held securely between rigid parts of the device, in particular when they have flangelike clamping edges, as is preferably the case. In an annular membrane, two such walls are preferably respectively arranged on the outer edge and on the inner edge of the membrane.

A rigid bearing surface for the membrane has the advantage that the position of the workpiece is defined exactly, which is advantageous for example for the transfer to a chuck of a processing machine. A snug bearing of the membrane on the rigid bearing surface can be achieved particularly safely by using an underpressure below the membrane. A conical shape for the fixed bearing surface has the advantage that the clamping forces, depending on the selection of the cone angle, can be chosen larger or smaller. In the case of smaller cone angles, the clamping force must be greater than in the case of larger cone angles.

According to a further feature of the invention, the total structure of the support device for the annular membrane involves only four relatively simply formed rigid parts, which can consist of plastic or metal.

BRIEF DESCRIPTION OF THE DRAWING

One exemplary embodiment of the invention is illustrated in the drawing, which is a diametrical cross-sectional view.

DETAILED DESCRIPTION

The holding device, which as a whole is identified with H, serves to hold a workpiece W. The device H is constructed rotation-symmetrically with respect to an axis 1. On the right of the axis 1 there is illustrated the condition during inserting or removing of the workpiece W, and on the left of the axis 1 the condition in which the workpiece W is clamped. The holding device has a base member 2, a membrane holding member 3 which rests on said base member 2, a membrane 4, a membrane clamping disk 5 which holds the membrane against the membrane holding member 3, and an enclosing ring 13 which holds the membrane holding member 3 against the base member 2. The composition and the cooperation of these main parts are discussed individually hereinafter.

The base member 2 has a shaft or shank 6 in which a cavity 7 is provided. The shaft 6 carries a disk-shaped part 8 of the base member 2. Several air channels 9 lead from the cavity 7 to the substantially flat upper surface 8a of the disk-shaped part 8. Two annular grooves are provided on the upper side of the disk-shaped part, in which grooves are provided elastic annular gaskets, namely so-called O-rings 10 and 11. The O-rings 10 and 11 are each arranged concentrically with respect to the axis 1.

The membrane holding member 3 rests with a substantially flat bottom surface 12 on the upper side 8a of the base member and elastically compresses the O-rings 10 and 11. The membrane holding member 3 is held on the base member 2 by the enclosing ring 13. The enclosing ring 13 is, for this purpose, pressed onto the base member 2 at 14.

A flat but relatively wide annular groove 15 is provided on the underside of the membrane holding member 3 and communicates with the air channels 9, and channels 16 extend upwardly from the groove 15 and exit through a frusto-conical upper surface 17 of the membrane holding member 3. The cone angle α of the frusto-conical surface 17 is relatively large in the illustrated exemplary embodiment, namely 170 degrees, so that the conical surface is only slightly inclined. The annular groove 15 lies with the annular zone between the O-rings 10 and 11, so that the cavity system 7, 9, 15 and 16 is sealed off against the environment.

The membrane holding member 3 has an outwardly facing annular outer groove 18 for engagement by the membrane 4. The lower wall of the outer groove 18 is defined by a radially outwardly projecting holding flange, onto which presses a shoulder 19 of the enclosing ring 13. A large opening 20 in the center of the membrane holding member 3 is filled substantially by the membrane clamping disk 5.

The membrane 4 is, as a whole, constructed annularly. It has a part 21 which, for adjusting to the upper side 17 of the membrane holding member 3, is constructed generally frusto-conically and serves as a support surface for the workpiece W. Two clamping walls 22 and 23 which are concentric to one another project downwardly from the radially inner and outer edges of the part 21. The outer clamping wall 23 has at its lower end a flangelike clamping edge 24 which engages the outer groove 18 of the membrane holding member. A corresponding clamping edge 25 on the inner clamping wall 22 engages the annular groove 26 on the membrane clamping disk 5.

The part 21 has near its radially outer edge a bulge-like thickened portion 27, on which is provided a radially inwardly facing annular clamping surface 28.

The holding device H operates as follows. When the holding device H is mounted, for example on a device for transporting workpieces W, the cavity 7 communicates with an air source, through which compressed air can be supplied to the cavity 7, and communicates with a vacuum source, through which air can be sucked out of the cavity system 7, 9, 15 and 16.

When a workpiece W is supposed to be received, the mentioned cavity system is placed under excess pressure, whereby the membrane is, so to speak, blown up or inflated and assumes the shape which is illustrated to the right of the axis 1. The clamping surface 28 is thereby enlarged and deformed so as to be funnel-shaped. The workpiece W can thus be easily inserted and can easily be gripped, without any need for a precise alignment of the workpiece W with respect to the holding device H. The funnel shape of the clamping surface 28 in this stage further eases the receiving of the workpiece W.

After the workpiece has been received in such a manner, as shown to the right of the axis 1, the pressure in the cavity system 16, 15, 9 and 7 is reduced, preferably to a pressure below the surrounding atmospheric pressure. The membrane part 21 rests hereby on the frusto-conical upper surface 17 of the membrane holding member 3. The clamping surface 28 is thereby constricted and firmly engages the cylindrical peripheral edge surface 29 of the workpiece W, which in the illustrated case is a cylindrical glass plate. The workpiece W is also slightly lowered, as is illustrated in the drawing. The workpiece W is now held fixedly in the holding device H and can be transported safely. The cavity system 16, 15, 9 and 7 has no connection to the outside, so that no danger of penetration of dirt into this system exists. The device thus has the advantage of a so-called indirect vacuum system.

When the membrane 4 is bulging in the manner shown in the right half of the drawing, there exists an annular chamber 31 between the frusto-conical surface 17 and the membrane part 21. This air chamber 31 shrinks in volume when the air pressure drops, and finally becomes zero when the membrane part 21 rests on the frusto-conical surface 17.

When the workpiece W is to be released, excess pressure is again supplied to the cavity system 7, 9, 15 and 16, whereby the membrane is bulged in the manner illustrated on the right of the axis 1. The workpiece W can now be removed without any resistance. Due to the small amount of surface area contact between the workpiece underside 30 and the membrane 4, a tight undesired suction therebetween after the vacuum is terminated is also avoided, even if moisture exists between the workpiece W and the membrane 4.

The invention has been described in connection with a holding device H which grips a workpiece W on its outer peripheral edge surface 29. However, the invention is also applicable for the holding of workpieces which have an inner edge. Naturally, in this case, the clamping edge faces radially outwardly and must be pulled inwardly when the workpiece is inserted, and must be expanded for clamping the workpiece. Such a holding device could, for example, be constructed so that the clamping surface is arranged on the outer side of a bulge corresponding with the bulge 27. Such a bulge could, for clamping, be expanded by pressurizing the membrane, similar to the situation illustrated on the right of the axis 1 in the drawing.

The above description speaks mostly of air as the gas with which the membrane 4 is pressurized. Of course, it is also possible to use a different gas. Also possible is a pressurization with a fluid other than a gas, for example pressurized oil. The application of a pressure below the surrounding atmospheric pressure, however, could be problematic. The invention does not exclude such embodiments, however, because the holding force could be produced exclusively through elastic characteristics of the membrane, so that the use of an underpressure is not needed.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for holding a delicate workpiece, comprising a membrane made of an elastic material and having an annular clamping surface which can engage an edge surface on the workpiece, and a support member which has channels therein and which has means for supporting said membrane in a fluid-tight manner so that an annular chamber exists between said support member and said membrane, said channels providing fluid communication between said chamber and one of a fluid pressure source and a vacuum source, wherein said membrane is annular and has, projecting from a back side thereof opposite from said annular clamping surface, a first clamping wall provided at a radially outer edge thereof and a second clamping wall provided at a radially inner edge thereof, wherein said support member includes a base member, a membrane holding member which rests on said base member and which has an annular portion projecting into the region between said first and second clamping walls, an enclosing ring which is connected to said base member and which presses said membrane holding member against said base member, and a membrane clamping disk which is disposed concentrically within said second clamping wall and presses said second clamping wall against said portion of said membrane holding member, and wherein variation of the fluid pressure in said chamber causes said membrane to be deformed in a manner effecting variation of the diametric size of said annular clamping surface.

2. The device according to claim 1, wherein said first clamping wall is clamped between said enclosing ring and said annular portion of said membrane holding member.

3. A device for holding a delicate workpiece, comprising an annular membrane made of an elastic material, an annular projection which is provided on and projects outwardly from said annular membrane and which has thereon a radially facing annular clamping surface engageable with an edge surface of a workpiece, a support member which has channels therein and has means for supporting said membrane in a fluid-tight manner by sealingly clamping said annular membrane along a radially outer edge portion and a radially inner edge portion of said membrane so that an annular chamber exists between said support member and said membrane, said channels being in fluid communication with said chamber, and pressure varying means in fluid communication with said channels for selectively varying the fluid pressure in said chamber in a manner causing said membrane to be deformed so as to effect variation of a diametric size of said annular clamping surface; wherein said membrane has, projecting outwardly from a side thereof opposite from said annular projection, a first clamping wall provided at a radially outer edge thereof and a second clamping wall provided at a radially inner edge thereof; wherein said means for supporting said membrane includes means for sealingly clamping said first and second clamping walls of said membrane on said support member; and wherein said support member includes a base member, a membrane holding member which rests on said base member and which has an annular portion projecting into the region between said first and second clamping walls, an enclosing ring which encircles said first clamping wall and is connected to said base member and which engages and presses said membrane holding member against said base member, and a membrane clamping disk which is disposed concentrically within said second clamping wall and presses said second clamping wall against said annular portion of said membrane holding member.

4. The device according to claim 3, wherein said annular projection is arranged in the region of a radially outer edge of said annular membrane, and wherein when said pressure varying means supplies a pressurized gas to said annular chamber said membrane is deformed in a manner causing said annular projection thereon to move from a first position in which said clamping surface is approximately cylindrical to a second position in which said clamping surface is approximately frusto-conical and diverges in a direction away from said membrane.

5. The device according to claim 4, wherein said support member has on said annular portion thereof a rigid bearing surface which faces said membrane, and wherein when said projection is in one of said first position and said second position thereof, a portion of said membrane rests on said rigid bearing surface provided on said support member.

6. The device according to claim 5, wherein said membrane clamps a workpiece on an outer peripheral edge surface of the workpiece, and wherein said rigid bearing surface is substantially frusto-conical and has a cone angle in the range of 160° to 175°.

7. The device according to claim 3, wherein said first clamping wall is clamped between said enclosing ring and said annular portion of said membrane holding member.

8. The device according to claim 3, wherein said membrane is inherently resilient, wherein as said pressure varying means changes the fluid pressure in said chamber from a first value to a second value said membrane is elastically deformed in a manner causing said projection to move from a first position to a second position, said clamping surface on said projection having different diametric sizes when said projection is respectively in said first and second positions, and wherein as said pressure varying means changes the fluid pressure in said chamber from said second value to said first value said inherent resilience of said membrane causes it to return to its original shape and to move said projection from said second position to said first position, said annular clamping surface being engageable with an edge surface of a workpiece placed in said device when said projection is in said first position, the gripping forces exerted on the workpiece by said clamping surface being produced entirely by said inherent resilience of said membrane.

9. A device for holding a delicate workpiece, comprising an annular membrane made of an elastic material, an annular projection which is provided on and projects outwardly from said annular membrane and which has thereon a radially facing annular clamping surface engageable with an edge surface of a workpiece, a support member which has channels therein and has means for supporting said membrane in a fluid-tight manner by sealingly clamping said annular membrane along a radially outer edge portion and a radially inner edge portion of said membrane so that an annular chamber exists between said support member and said membrane, said channels being in fluid communication with said chamber, and pressure varying means in fluid communication with said channels for selectively varying the fluid pressure in said chamber in a manner causing said membrane to be deformed so as to effect variation of a diametric size of said annular clamping surface; wherein said membrane has a thin, washerlike shape; wherein said annular projection projects axially outwardly from a radially outer edge of said membrane and in a direction away from said support member; wherein said support member includes an annular portion having thereon an axially facing annular surface, said channels in said support member opening through and said membrane being adjacent said annular surface on said support member; and wherin said means for supporting said annular membrane includes said membrane having first and second annular clamping walls respectively extending axially outwardly from a radially outer edge and a radially inner edge thereof in a direction opposite to the direction in which said annular projection projects axially outwardly from said membrane, said first and second clamping walls being concentric and said annular portion of said support member being concentrically disposed between said first and second clamping walls, said means for supporting said annular membrane further including a clamping disk which is disposed concentrically within said second clamping wall and sealingly presses said second clamping wall against said annular portion of said support member, and an enclosing ring which concentrically encircles said first clamping wall and sealingly presses said first clamping wall against said annular portion of said support member.

10. The device according to claim 9, wherein said first and second clamping walls each have an annular and radially inwardly extending flange at an end thereof remote from said membrane, wherein said clamping disk has an annular peripheral groove which receives said flange on said second clamping wall, wherein said annular portion of said support member has an annular peripheral groove which receives said annular flange on said first clamping wall, and wherein said membrane and said annular surface on said annular portion of said support member are each frusto-conical.

11. The device according to claim 10, wherein said annular membrane, said annular projection, and said first and second annular clamping walls are respective integral portions of a single annular elastic element.

12. The device according to claim 11, wherein said annular clamping surface on said annular projection is a radially inwardly facing surface.

* * * * *